United States Patent [19]

Williams

[11] Patent Number: 5,586,754

[45] Date of Patent: Dec. 24, 1996

[54] GRID BLOCK WORKPIECE CLAMPING APPARATUS

[76] Inventor: Willis R. Williams, 767 S. Fielder, Arlington, Tex. 76013

[21] Appl. No.: 514,358

[22] Filed: Aug. 11, 1995

[51] Int. Cl.$^6$ .................................................. B23Q 3/02
[52] U.S. Cl. ............................. 269/99; 269/45; 269/101; 269/147; 269/296; 269/900
[58] Field of Search ........................................ 269/9, 37, 40, 269/45, 88, 96, 99, 100, 101, 147, 166, 170, 203, 246, 268, 900, 910, 292, 296, 906, 909, 152, 155, 249

[56] References Cited

U.S. PATENT DOCUMENTS

| | | | |
|---|---|---|---|
| 576,758 | 2/1897 | Griffin | 269/100 |
| 2,495,632 | 1/1950 | Hansen et al. | 269/296 |
| 4,170,345 | 10/1979 | Townsend | 269/88 |
| 4,386,767 | 6/1983 | Dyckes et al. | 269/147 |
| 4,445,678 | 5/1984 | George | 269/88 |
| 4,498,662 | 2/1985 | Halter | 269/101 |
| 4,513,955 | 4/1985 | Daubon | 269/155 |
| 4,592,541 | 6/1986 | Huray | 269/155 |
| 4,607,829 | 8/1986 | Suska | 269/249 |
| 4,794,687 | 1/1989 | Peters et al. | 269/900 |
| 5,192,060 | 3/1993 | Novak | 269/147 |
| 5,395,100 | 3/1995 | Steinbarger | 269/101 |

*Primary Examiner*—Robert C. Watson
*Assistant Examiner*—Thomas W. Lynch
*Attorney, Agent, or Firm*—Henderson & Sturm

[57] ABSTRACT

A workpiece clamping apparatus for securing a workpiece relative to a planar support surface including a pair of contoured block members, each provided with a plurality of slots and apertures and having a base provided with structure for operatively attaching the block members to the planar support surface. A bar clamp has structure for securing a workpiece and further has opposite ends wherein each end of the bar clamp is operably associated with one of the pair of block members. The plurality of slots and apertures are axially aligned in both the vertical and horizontal planes. Each slot is operatively associated with a selected one of the plurality of apertures and is further dimensioned to receive one of the ends of the bar clamp. The plurality of apertures further include at least one aperture formed in the base of each contoured block wherein the at least one aperture is provided with structure for operably connecting the block member to the planar support surface. A pair of saddle clamps are each adapted to secure one end of a bar clamp and one end of a pipe and a connector is provided for mounting said saddle clamps on the block members.

5 Claims, 3 Drawing Sheets

GRID BLOCK WORKPIECE CLAMPING APPARATUS

TECHNICAL FIELD

The present invention relates to clamping arrangements in general and in particular to a workpiece clamping apparatus for securing a workpiece to a planar support surface.

BACKGROUND ART

Up until the present time, both professional and amateur craftsmen have been frustrated by the failure of the industry to provide an economically priced worktable that offers both a stable work surface and/or platform that is specifically designed to accommodate a wide variety of power tools, clamps and accessories to allow the draftsmen to perform a variety of tasks on different workpieces.

With the impending introduction of the subject matter of co-pending patent application Ser. No. 08/245,286 filed May 16, 1994, and entitled Collapsible Workbench Apparatus, a part of the solution to the above stated problem will be in place.

This particular invention involves a new style, collapsible workbench whose work surface employs a novel combination of channel tracks and spaced apertures that not only lend themselves to the mounting of existing power tools but which have also spawned an entire family of workpiece clamping apparatus that can be employed both alone and in combination with one another to immobilize a workpiece relative to the newly designed work surface.

DISCLOSURE OF THE INVENTION

An object of the present invention is to provide a workpiece clamping apparatus that will securely position a workpiece relative to a planar support surface.

Another object of the present invention is to provide a workpiece clamping apparatus that can be accommodated on any work support surface provided with rows of apertures and/or a plurality of channel tracks to fixedly secure a workpiece relative to the work support surface.

A further object of the present invention is to provide a workpiece clamping apparatus that can be used either alone or in combination with other related workpiece clamping apparatus to secure various workpieces in a variety of different orientations, both relative to a work support surface and/or the different workpiece clamping apparatus.

Still another object of the present invention is to provide a family of workpiece clamping apparatus components that can be combined with other related components in a variety of ways to produce different clamping configurations.

Yet another object of the present invention is to provide a workpiece clamping apparatus that is economically priced, rugged in construction, simple to use, either by itself or in combination with other clamping arrangements, and which has a long useful life.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
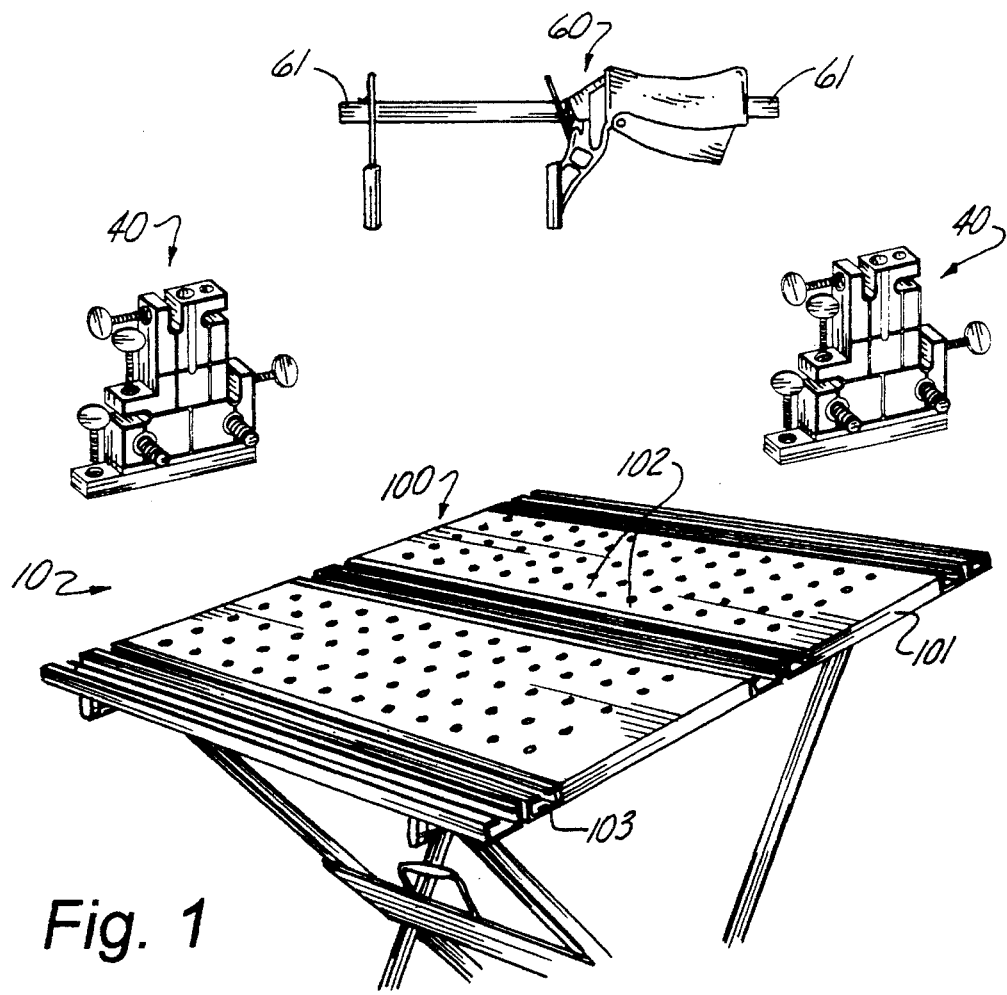
FIG. 1 is an exploded perspective view of the main components that comprise the workpiece clamping apparatus that forms the basis of the present invention.

As can be seen by reference to the drawings, and in particular to FIG. 1, the work piece clamping apparatus that forms the basis for the present invention is designated generally by the reference numeral 10. Prior to embarking on a detailed description of the work piece clamping apparatus 10 it would be first advisable to describe the environment in which this invention is employed.

As shown in FIG. 1, a generally planar support surface 100 is provided, comprising a rigid support surface 101 provided with a plurality of spaced apertures 102 arranged in rows. In addition, the rigid support surface 101 is further provided with a plurality of track members 103. Still referring to FIG. 1, it can be seen that the work piece clamping apparatus 10 comprises in general a pair of block members 40 and a bar clamp member 60. These components will now be described in seriatim fashion.

Figure 2:
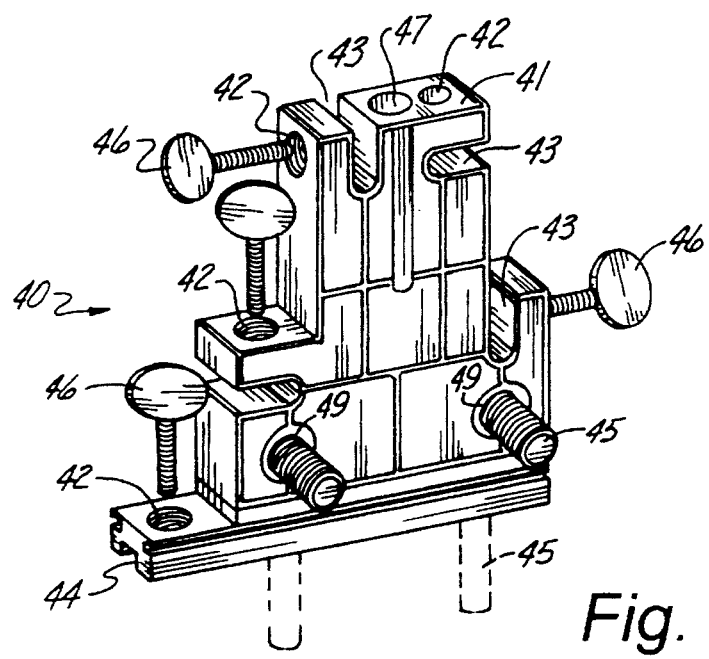
FIG. 2 is an isolated perspective view of one of the contoured block members of the clamping.

As can be seen by reference to FIG. 2, each of the block menders 40 comprise a generally contoured block element 41 provided with a plurality of apertures 42 and slots 43. In addition, both the plurality of apertures 42 and slots 43 are aligned in both the vertical and horizontal directions for reasons which will be explained presently.

Still referring to FIG. 2, it can be seen that the contoured block element 41 is further provided with a base portion 44 which is configured to be received within the channel tracks 103 of the generally planar support surface 100. In addition, as shown in phantom the base portion 44 is further adapted to receive post elements 45 which are threadedly engaged in suitable apertures provided in the base portion 44, wherein the post elements 45 are further dimensioned to be received in the plurality of apertures 102 and the rigid generally planar support surface.

By now it should be apparent that the contoured block member 40 is adapted to be either received in the channel tracks 103 of the generally rigid planar support surface 100, or in the plurality of apertures 102 formed thereon. In the first instance, the base portion 44 is fixedly secured within a channel 103 at a desired location by engagement of a threaded securing element 46 through a threaded aperture 42 formed in the base portion.

As can also be seen by reference to FIG. 2, each of the slots 43 and the contoured block element 40 are operately associated with threaded apertures 42 that are dimensioned to receive similar securing means 46 as will be explained presently.

Returning once more to FIG. 1, it can be seen that the pair of contoured block members 40 are intended for use in conjunction with a bar clamp 60, the opposite ends 61 of the bar clamp 60 may be received in either a vertical or horizontal orientation relative to the contoured block member 40, and fixedly secured therein by engagement with a selected securing element 46.

Figure 3:
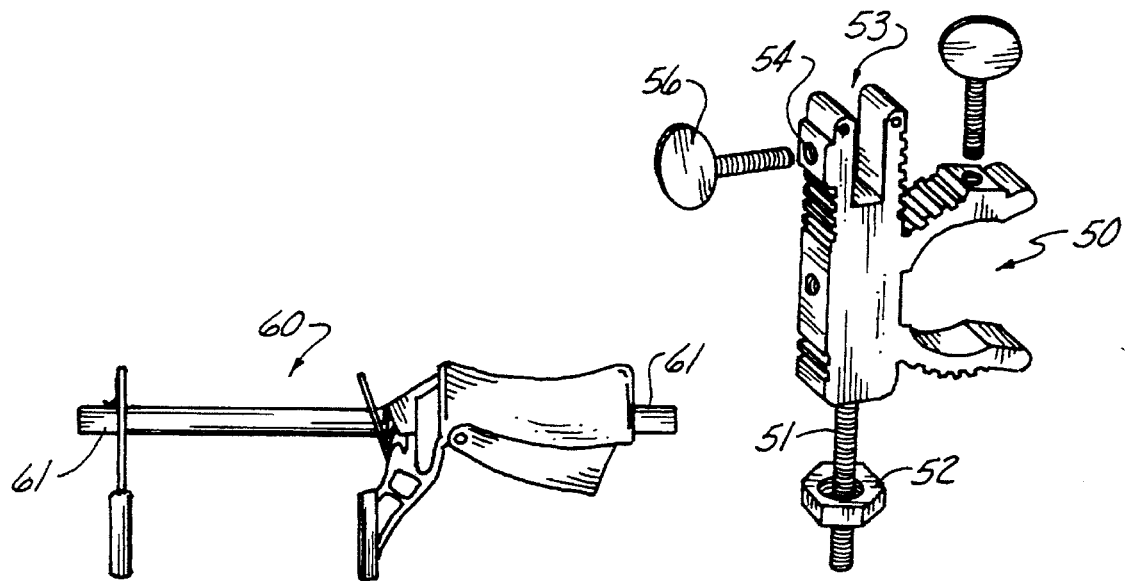
FIG. 3 is an exploded perspective view of the bar clamp, a saddle clamp and a block member in their operative disposition relative to one another.
Figure 3:
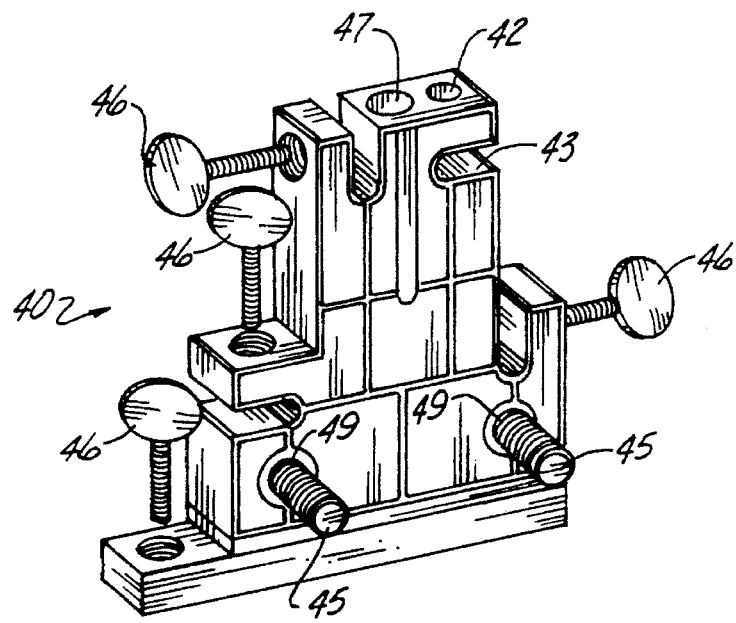

Turning now to FIG. 3, it can be seen that in addition to the threaded apertures 42 and the contoured block member 40, there is also provided an enlarged aperture 47 dimensioned to receive an elongated connecting member 51, which operably connects a saddle clamp member 50 to the contoured block member 40. The saddle clamp member 50 is employed in those instances wherein the height of the bar clamp member 60 is desired to be adjustably elevated above the height of the contoured block member 40, per se.

As shown in FIG. 3, the saddle clamp member 50 is provided with a bar clamp receiving recess 54 which communicates with a threaded aperture 55 dimensioned to receive a bar clamp securing member 56. In addition, the elongated threaded connecting member 51 is further provided with a threaded female member 52 whose height relative the elongated threaded male member 51 may be varied, to suspend the bar clamp recess 53 at different heights relative to the top of the contoured block member 40.

Figure 4:
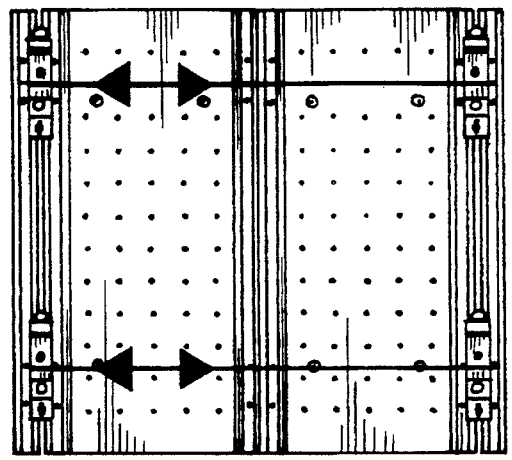
FIG. 4 is a top plan view showing the block member secured in the channel tracks of the planar support surface.
Figure 5:
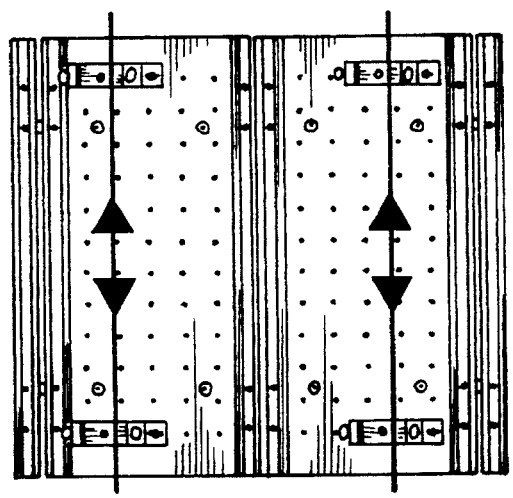
FIG. 5 is a top plan view showing the block members secured in the apertures of the planar support surface.
Figure 6:
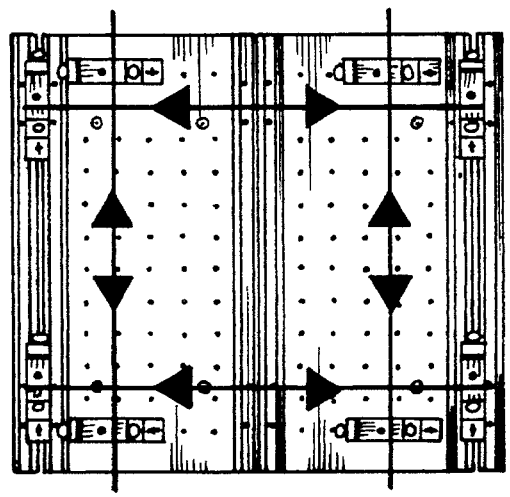
FIG. 6 is a top plan view showing the block members secured in both the apertures and the channel tracks of the planar support surface.

Turning now to FIGS. 4–6, it can be seen that the pairs of contoured block members 40 may be positioned in the tracks 103 of the generally planar support member 100 to suspend a bar clamp member 60 above the generally planar support surface as shown in FIG. 4, or the pairs of contoured block members 40 may be positioned directly on the rigid planar support surface 101 using the securing pegs 45 disposed in the suitably dimensioned apertures 102 to likewise suspend a bar clamp member 60 above the generally planar work surface as shown in FIG. 5.

In addition, as shown in FIG. 6, different pairs of contoured block members may be disposed respectively in both, the track channel members 103, and in the apertures 102 of the rigid support surfaces, to support and suspend a plurality of bar clamp members 60 in a generally rectangular configuration as shown in FIG. 6. As can also be seen by reference to FIG. 2 and FIG. 4, the contoured block members 40 are further provided with a plurality of recesses 49 which are dimensioned to receive the support posts 45 for storage purposes, so that the support posts 45 are available for use when desired.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A workpiece clamping apparatus for securing a workpiece relative to a planar support surface provided with a plurality of spaced apertures and a plurality of elongated channels, wherein the workpiece clamping apparatus comprises:

a pair of generally rectangular contoured block members each provided with a plurality of vertically and horizontally aligned slots and apertures; wherein each block member has a contoured base dimensioned to be slidably received in the plurality of elongated channels in the planar support surface;

means for selectively engaging the contoured base of each block member with the spaced apertures and the elongated channels of said planar support surface; and, a plurality of threaded securing elements operatively associated with said plurality of vertically and horizontally aligned slots.

2. The workpiece clamping apparatus as in claim 1; wherein, the means for selectively engaging the contoured base of each block members includes a securing element which extends through said contoured block to fixedly secure said contoured block within one of said plurality of channels in the planar support surface.

3. The workpiece clamping apparatus as in claim 2; wherein, the means for selectively engaging the contoured base of each block member further includes a plurality of post elements having one end dimensioned to be received in vertically aligned apertures in the contoured base, wherein the other end of the post elements are dimensioned to be received in selected ones of said plurality of apertures in the planar support surface.

4. The workpiece clamping apparatus as in claim 3; wherein, each block member is further provided with a plurality of recesses dimensioned to receive said plurality of post elements in the storage mode.

5. The workpiece clamping apparatus as in claim 1; wherein, each block member is further provided with an enlarged aperture dimensioned to receive an elongated connecting member.

\* \* \* \* \*